Oct. 28, 1930.  C. J. ASHBY  1,779,723

ELECTRICALLY OPERATED LAWN MOWER

Filed May 26, 1928

Patented Oct. 28, 1930

1,779,723

UNITED STATES PATENT OFFICE

CASSIUS JEFFERSON ASHBY, OF EVANSVILLE, INDIANA

ELECTRICALLY-OPERATED LAWN MOWER

Application filed May 26, 1928. Serial No. 280,772.

This invention relates to an improved multiple cutter electrically operated lawn mower which is adapted for adjustment so that the grass may be cut to any desired height.

The object of the invention is to provide an improved combination of cutters or knives, operating means therefor whereby they will be simultaneously reciprocated in opposite directions, and an electric motor for operating said operating means.

My improved lawn mower need only be wheeled about by the user when the motor is connected to any suitable source of current, to enable the grass to be rapidly and easily cut to any desired height.

A practical embodiment of the invention is set forth hereinafter and recited in the appended claims.

Figure 1:
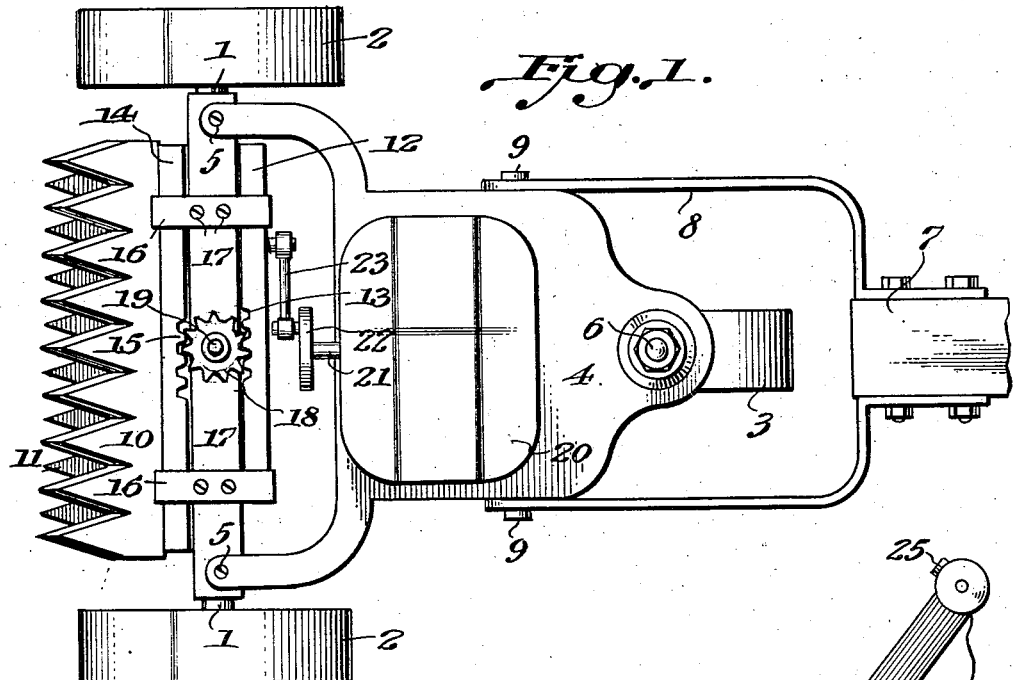
Figure 1, is a plan view.
Figure 2:
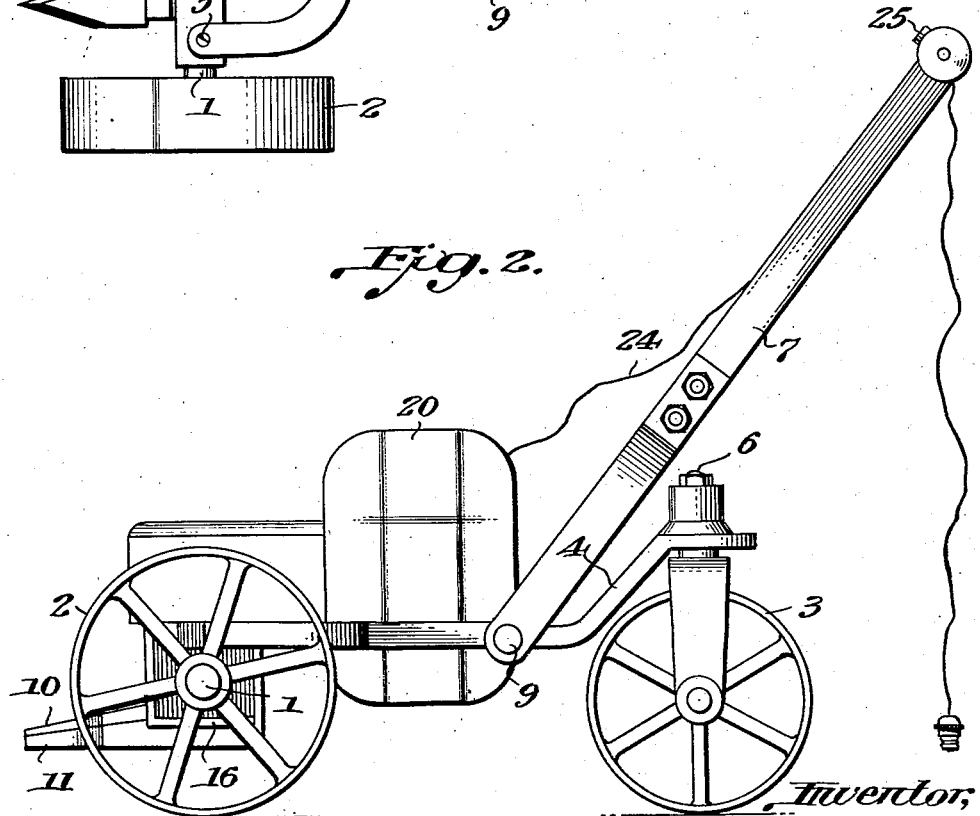
Fig. 2, is a side elevation.

The front axle is shown at 1, the front wheels appear at 2 and the swivelled trailer wheel is designated 3. The main frame is shown at 4, said frame being connected to the front axle at 5. The rear, or trailer, wheel 3 has an adjustable swivelled bearing 6 which enables the rear end of the frame 4 to be elevated to any desired extent, thereby to regulate the distance the knives are intended to be above the surface of the ground so that the grass may be cut at any length.

The handle 7 which is intended to be manipulated by the user, has a yoke 8 pivoted to frame 4 at 9.

There are upper and lower reciprocatory knives or cutters 10, 11 which are arranged, one above the other, both of said knives being adapted to reciprocate and to travel in opposite directions. The knives or cutters are provided with teeth, whose cutting edges shear the grass between them as the knives travel in opposite directions.

The lower knife 11 is provided with a bar 12 provided with a rack 13. The upper knife 10 is provided with a bar 14 having a rack 15.

The bars 12 and 14 are mounted in stirrups or hangers 16 which are connected to the axle 1 at 17.

A pinion 18 which is mounted on axle 1 at 19, meshes with the racks 13, 15, thereby insuring equal and simultaneous travel of the knives or cutters in opposite directions to each other when either one of the bars 12, 14, is reciprocated.

An electric motor 20, which is suitably carried on the main frame 4 has its shaft 21 provided with a wrist wheel 22 which is connected by a connecting rod or pitman 23 to either one of the bars 12, 14. As shown, the pitman 23 is connected to the bar 12.

An electric conductor 24 leads to the motor 20 and is provided with any suitable hand operated switch 25 carried at a suitable point on the machine as, for instance, on the handle 7. The conductor 24 will be provided with any suitable plug and will be of any desired length so that the plug may be connected to an electric socket at any desired point, enabling the machine to be pushed about over the lawn.

When the motor 20 is supplied with current, the bars 12, 14 are rapidly reciprocated in opposite directions for the purpose of cutting the grass.

By adjusting the bearing 6, the rear end of the frame 4 may be raised or lowered to depress or elevate the cutters 10, 11 so that the grass may be cut to any desired length.

What I claim is:

1. In a lawn mower, the combination with a frame, an axle and supporting wheels therefor, of stirrups suspended by said axle, reciprocatory cutters located one above the other and adapted to travel in opposite directions, racks attached to the respective cutters, said racks being located, respectively, in front and at the rear of said axle and which are guided by said stirrups, a pinion carried by the axle and meshing with the said racks, and a motor self-contained with said lawn mower and having an operative connection to one of said racks.

2. In a lawn mower, the combination with a frame, an axle and supporting wheels therefor, of stirrups suspended by said axle, reciprocatory cutters located one above the other and adapted to travel in opposite directions, racks attached to the respective cutters, said racks being located, respectively, in front and at the rear of said axle and which are guided by said stirrups, a pinion carried by the axle and meshing with the said racks, an electric motor carried by said lawn mower, a wrist wheel, and a pitman connected to said wrist wheel and to one of said racks whereby the racks are simultaneously operated from the said electric motor.

In testimony whereof I affix my signature.

CASSIUS JEFFERSON ASHBY.